(12) United States Patent
Jang et al.

(10) Patent No.: US 10,077,351 B2
(45) Date of Patent: Sep. 18, 2018

(54) GRAPHENE DISPERSION AND GRAPHENE REINFORCED POLYMER

(71) Applicant: Angstron Materials (Asia) Limited, Taoyuan (TW)

(72) Inventors: Bor Z. Jang, Centerville, OH (US); Aruna Zhamu, Springboro, OH (US); Feng-Yu Tsai, Taipei (TW); Dung-Yue Su, Taoyuan (TW); Che-Chen Hsu, Kaohsiung (TW); Guo-Cyuan Fang, Taoyuan (TW); Hung-Wei Liu, Hsinchu (TW); Fan-Chun Meng, New Taipei (TW); Chin-Chuan Chang, Kaohsiung (TW)

(73) Assignee: Angstron Materials (Asia) Limited, Taipei, Taiwan (CN)

( * ) Notice: Subject to any disclaimer, the term of this patent is extended or adjusted under 35 U.S.C. 154(b) by 89 days.

(21) Appl. No.: 15/389,457

(22) Filed: Dec. 23, 2016

(65) Prior Publication Data

US 2018/0179359 A1   Jun. 28, 2018

(51) Int. Cl.
    *C08K 3/04*      (2006.01)
    *C01B 31/04*     (2006.01)

(52) U.S. Cl.
    CPC ............ *C08K 3/04* (2013.01); *C01B 31/0484* (2013.01)

(58) Field of Classification Search
    CPC ........................................................ C08K 3/04
    USPC .................................................... 524/495
    See application file for complete search history.

(56) References Cited

U.S. PATENT DOCUMENTS

| 2012/0288788 | A1 | 11/2012 | Roetker |
| 2013/0197256 | A1 | 8/2013 | Wu |
| 2016/0291472 | A1 | 10/2016 | Shin |
| 2017/0260054 | A1* | 9/2017 | Yu .......................... C01B 32/194 |

FOREIGN PATENT DOCUMENTS

| CN | 105408104 A | 3/2016 |
| TW | I481644 | 4/2015 |
| TW | I519615 | 2/2016 |
| TW | I522416 | 2/2016 |
| TW | 201620607 | 6/2016 |

* cited by examiner

*Primary Examiner* — Deve E Valdez
(74) *Attorney, Agent, or Firm* — Winston Hsu

(57) ABSTRACT

A graphene dispersion includes a graphene material and a polymerizable monomer. The polymerizable monomer has a structure including the first part and the second part. The first part is at one end of the structure and includes at least one benzene ring, and the second part is at another end of the structure and has polarity.

20 Claims, 3 Drawing Sheets

GRAPHENE DISPERSION AND GRAPHENE REINFORCED POLYMER

BACKGROUND OF THE INVENTION

1. Field of the Invention

The present invention generally relates to a graphene dispersion and a graphene reinforced polymer made from the graphene dispersion, and more particularly, to a uniformly dispersed graphene dispersion and related graphene reinforced polymer.

2. Description of the Prior Art

Graphene is an atomically thick, two-dimensional sheet composed of $sp^2$-hybridized carbon atoms bonded in the hexagonal lattice. Graphene has significantly excellent electric conductivity, mechanical properties, and gas-impermeability. Since graphene can be applied to various fields as the next-generation material, research into a technology of utilizing graphene has been largely conducted. For example, many attempts have been made to utilize graphene and its derivatives as nanofillers to enhance the performance of polymers. However, the improvement is limited by the difficulty of obtaining well-dispersed graphene in polymer matrices because the strong cohesive forces among graphene sheets typically prevent thorough intermixing between a polymer matrix and graphene. Such difficulty also persists in the cases where graphene is first dispersed in the monomer of a polymer, followed by polymerization and/or crosslinking reactions of the monomer to form a graphene-reinforced polymer matrix.

SUMMARY OF THE INVENTION

It is one of the objectives of the present invention to provide a graphene dispersion and a graphene reinforced polymer, wherein graphene is well-dispersed in the graphene dispersion and the graphene reinforced polymer.

To achieve the above objective, an embodiment of the present invention provides a graphene dispersion including a graphene material and a polymerizable monomer. The structure of the polymerizable monomer includes a first part and a second part, wherein the first part is at one end of the structure and includes at least one benzene ring, and the second part is at another end of the structure and has polarity.

Another embodiment of the present invention provides a graphene reinforced polymer, wherein the graphene reinforced polymer is polymerized from the above-mentioned graphene dispersion.

As set forth above, since the polymerizable monomers have specific structures and property, the graphene material can be well-dispersed in the polymerizable monomers of the graphene dispersion and as well as in the graphene reinforced polymer according to the present invention.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
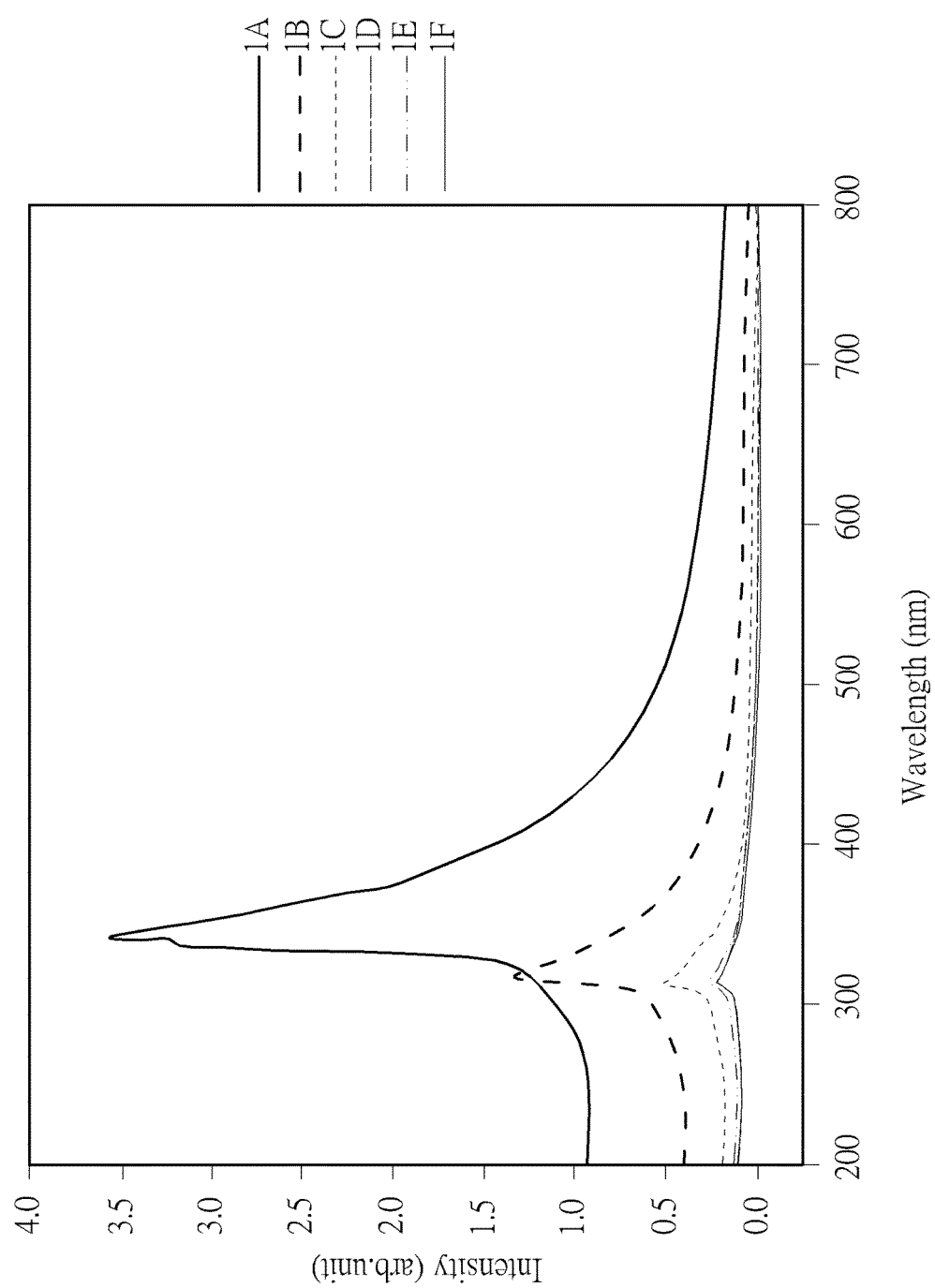
FIG. 1 is a schematic diagram illustrating absorption spectra of supernatants according to Experimental Example 1 of the present invention.

The present invention may include a variety of modifications and may be embodied in many different forms, particular embodiments of which will be now provided and described in detail. However, it is not intended to limit the present invention to specific disclosed forms, and it should be construed that all modifications, equivalents, or substitutes may be made to the invention without departing from the technical sprit and scope of the invention.

The present invention will be described in more detail below.

According to an embodiment of the invention, a graphene dispersion is provided. The graphene dispersion includes a graphene material and a polymerizable monomer.

In this embodiment, the content of the graphene material in the graphene dispersion is about 0.1% to about 0.5% by weight, but limited thereto.

In this embodiment, the graphene material includes graphene oxide (GO), reduced graphene oxide (rGO), high purity graphene, or a combination of any two or three mentioned above. These three different types of graphene material can be characterized by the amount of the oxygen (O) atoms in the graphene material as the following. The ratio between the number of O atoms and the total number of O atoms and C atoms of graphene oxide is about 50% or more. In other words, the number of O atoms is present in the amount of about 50 atomic percent or more of GO. The number of O atoms is present in the amount of about 3 to about 50 atomic percent of rGO, and the number of O atoms is present in the amount less than about 3 atomic percent of the high purity graphene. The above-mentioned different types of graphene material can also be characterized by the ratio of carbon (C) atoms to O atoms (C/O). For example, the C/O ratio of GO can be about 50/50 or less than about 50/50, the C/O ratio of rGO can be about 50/50 to about 97/3, and the C/O ratio of the high purity graphene can be more than about 97/3. It is noteworthy that GO, rGO and the high purity graphene are all applicable to the graphene dispersion in this embodiment.

The graphene dispersion of the present invention includes a specific polymerizable monomer with specific property. The structure of the polymerizable monomer includes a first part and a second part. The first part is at one end of the structure and includes at least one benzene ring. For example, the first part may be selected from the group consisting of a phenyl group and a phenoxy group. In a variant embodiment, the first part may include a biphenyl group which includes two benzene rings. The second part is at another end of the structure of the polymerizable monomer and has polarity. Preferably, the second part of the structure of the polymerizable monomer has high polarity. In a preferred embodiment, the second part is selected from the group consisting of an acrylate-based functional group, a methacrylate-based functional group, a thiol-based functional group, an epoxide-based functional group, and an isocyanate-based functional group. In another embodiment, the second part may be a maleic anhydride group. As a result, in a preferable embodiment, the polymerizable monomer is selected from the group consisting of 2-phenoxy ethyl acrylate (PHEA) and ortho-phenyl phenoxy ethyl acrylate (OPPEA), wherein PHEA is represented by the following Formula I, and OPPEA is represented by the following Formula II.

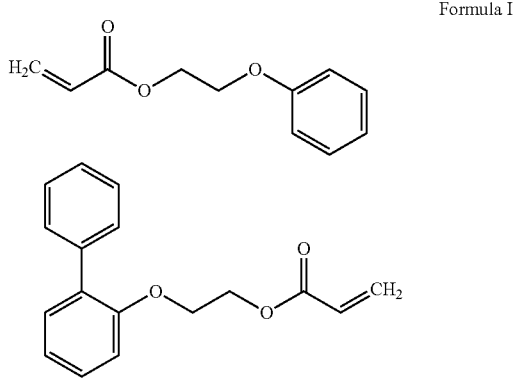

Formula I

Formula II

The polymerizable monomer PHEA shown as Formula I includes a phenyl group, more particularly a phenoxy group, at one end of its compound structure as the first part, and has an acrylate-based functional group at another end of its compound structure as the second part having polarity. In another aspect, the polymerizable monomer OPPEA shown as Formula II includes a phenyl group, more particularly an ortho-phenyl phenoxy group, at one end of its compound structure as the first part, and has an acrylate-based functional group at another end of its compound structure as the second part having polarity. In addition, the first part of OPPEA may be considered to include a biphenyl structure in the ortho-phenyl phenoxy group.

It should be noted that the graphene dispersion of the present invention may include one or more kinds of polymerizable monomers that meet the above-mentioned specific characteristics of polymerizable monomers, and may further selectively include other polymerizable monomers that do not meet the above-mentioned specific property. Additionally, the graphene dispersion of the present invention may also include oligomers of one or more kinds of polymerizable monomers that meet the above-mentioned specific characteristics of polymerizable monomers.

According to one embodiment of the present invention, the graphene dispersion may be formed by the following method. First, a mixture is obtained by providing graphene powder and the above-mentioned polymerizable monomers, wherein the graphene powder may include stacked graphene nanosheets, but not limited thereto. Next, a blending treatment is performed to the mixture, so as to obtain a graphene dispersion. For example, the blending treatment may include, but not limited to, an ultrasonic treatment or a stirring procedure by a planetary mixer. According to this embodiment, the ultrasonic treatment is carried out before using the planetary mixer to blending the mixture. However, the sequence of using the planetary mixer and the ultrasonic treatment are not limited. The preparation of the graphene dispersion can be performed at room temperature, but not limited thereto. Heating throughout the process of preparing the graphene dispersion is also applicable.

After the above procedures, the graphene included in the powder is exfoliated into monolayer or multilayer graphene nanosheets, and the exfoliated graphene nanosheets are well-dispersed in the polymerizable monomers. According to the present invention, the first part of the polymerizable monomer forms a strong attachment to graphene nanosheets through n-n interactions, while the second part of the polymerizable monomer repels nearby graphene nanosheets because of its high polarity, thus enabling thorough exfoliation of graphene nanosheets and their uniform dispersion in the polymerizable monomer. Accordingly, an additional conventional dispersant, e.g. a surfactant, is no longer required for exfoliating and dispersing graphene under the presence of the polymerizable monomers in this embodiment. It is noteworthy that the graphene powder provided for the mixture is not limited to stacked-multilayer nanosheets, and any other kind of graphene powder may be applied to this embodiment. For example, the graphene powder with the structures of stacked graphene petals or stacked graphene nanoplatelets may be used for forming the mixture, and they may still be exfoliated well into monolayer or multilayer graphene petals or monolayer or multilayer graphene nanoplatelets respectively.

An example of the preparation of the graphene dispersion is described below. 0.07 g of graphene powder and 99.93 g of OPPEA are provided first. The ultrasonic treatment is performed to the above-mentioned mixture next for 30 minutes, and the mixture is further stirred by the planetary mixer for 5 minutes. The method and apparatuses used in the above-mentioned preparation of the graphene dispersion are not limited to this embodiment, other methods or apparatuses may also be applied to the preparation of the graphene dispersion, and the sequence of the procedures of blending treatments are not limited as well.

According to a variant embodiment of the present invention, one or more initiators may be further provided with graphene powder and the polymerizable monomer to form the graphene dispersion to be polymerized. The initiator added to the graphene dispersion includes one of 1-hydroxy-cyclohexyl-phenyl-ketone, benzophenone, 2-hydroxy-2-methyl-1-phenyl-1-propanone, 2-hydroxy-1-[4-(2-hydroxy-ethoxy)phenyl]-2-methyl-1-propanone, alpha, alpha-dimethoxy-alpha-phenylacetophenone, oxy-phenyl-acetic acid 2-[2 oxo-2 phenyl-acetoxy-ethoxy]-ethyl ester, oxy-phenyl-acetic 2-[2-hydroxy-ethoxy]-ethyl ester, methylbenzoylformate, 2-benzyl-2-(dimethylamino)-1-[4-(4-morpholinyl) phenyl]-1-butanone, 2-Methyl-1-[4-(methylthio) phenyl]-2-(4-morpholinyl)-1-propanone, diphenyl (2,4,6-trimethylbenzoyl)-phosphine oxide, phosphine oxide, phenyl bis(2,4,6-trimethyl benzoyl)-phosphine oxide, bis (eta 5-2,4-cyclopentadien-1-yl)-bis[2,6-difluoro-3-(1H-pyrrol-1-yl)phenyl]titanium, and iodonium, (4-methylphenyl) [4-(2-methylpropyl) phenyl]-, hexafluorophosphate(1-). In addition, the content of the initiator in the graphene dispersion is about 2% to about 20% by weight.

According to the prevent invention, a graphene reinforced polymer is further provided by polymerizing the above-mentioned graphene dispersion to form a uniformly-dispersed graphene reinforced polymer. Preferably, the graphene reinforced polymer is polymerized from the above-mentioned graphene dispersion including an initiator, such as one or more of the above-mentioned initiators. In one embodiment of the present invention, the graphene material included in the graphene reinforced polymer has the solid content from about $1*10^{-3}$% to about 90% by weight. The graphene reinforced polymer is polymerized with one or both of a UV light treatment and a heat treatment. For example, the UV light treatment may be performed first and the heat treatment may be performed next. Thus, the graphene reinforced polymer is a thermosetting polymer or a photo-polymerized polymer.

An example of the preparation of the graphene reinforced polymer is described below. 0.5 g of graphene powder, 96.5 g of OPPEA, and 3 g of initiator are provided first. The ultrasonic treatment is performed to the above-mentioned mixture for 30 minutes, and then the mixture is further stirred by the planetary mixer for 30 minutes, so as to obtain the graphene dispersion. Next, the graphene dispersion is polymerized under the UV light with the intensity of 184 mW/cm$^2$ for 120 seconds, and the graphene reinforced polymer is obtained.

In another example of the preparation of the graphene reinforced polymer, the graphene dispersion is polymerized by the heat treatment with the temperature of 40° C. for 1 hour, and the graphene reinforced polymer is obtained.

It should be noted that the above-mentioned polymerization process, process time, light intensity, polymerization temperature, or any other polymerization conditions may be varied based on the composition and the concentration of the graphene dispersion and the process parameters. For example, the total illumination time of the UV light to the graphene dispersion may be longer or shorter based on the sample path length and the intensity of light source.

In this embodiment, the graphene reinforced polymer is polymerized through the polymerizable monomers; since the graphene material is already well-dispersed within the polymerizable monomers in the graphene dispersion, the graphene reinforced polymer also contains uniformly-dispersed graphene after polymerization. Therefore, the graphene reinforced polymer may have a better performance, such as good mechanical property or good gas-impermeability. More importantly, the above-mentioned specific polymerizable monomers are capable of dispersing graphene and also polymerizable, and therefore the limitation of the improvement of the performance of resin or polymers caused by the poor dispersibility of graphene can be overcome by utilizing the polymerizable monomers in the present invention.

The above-mentioned examples are provided merely for the purpose of illustrating the invention, and the scope of the invention is not limited by these examples. Hereinafter, the advantageous effects of the present invention will be verified through experimental examples. Those skilled in this art may easily understand the benefits and effects that can be achieved by the present invention via the content of experimental examples, and may make various modifications without departing from the spirit of the present invention.

Example 1A: Preparation of GO-Monomers Mixture 70 mg of GO powder and 70 ml of OPPEA are provided and mixed or blended by the planetary mixer for 5 minutes. The ultrasonic treatment is performed to the liquid GO-OPPEA mixture next. The liquid GO-OPPEA mixture is next filled into the ultracentrifuge tube and ultracentrifuged at 20000 rpm for 10 minutes so as to obtain the supernatant.

Example 1B: Preparation of GO-Monomers Mixture

The supernatant is prepared by the same method as Example 1A, except using PHEA instead of OPPEA.

Comparative Example 1C: Preparation of GO-Monomers Mixture

The supernatant is prepared by the same method as Example 1A, except using styrene instead of OPPEA. Styrene is represented by the following Formula III.

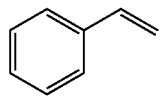

Formula III

Comparative Example 1D: Preparation of GO-Monomers Mixture

The supernatant is prepared by the same method as Example 1A, except using 1, 4-butanediol diacrylate instead of OPPEA. 1, 4-butanediol diacrylate is represented by the following Formula IV.

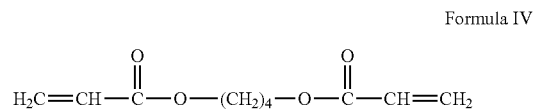

Formula IV

Comparative Example 1E: Preparation of GO-Monomers Mixture

The supernatant is prepared by the same method as Example 1A, except using 1, 6-hexanediol diacrylate instead of OPPEA. 1, 6-hexanediol diacrylate is represented by the following Formula V.

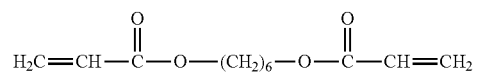

Formula V

Comparative Example 1F: Preparation of GO-Monomers Mixture

The supernatant is prepared by the same method as Example 1A, except using 1, 10-decanediol diacrylate instead of OPPEA. 1, 10-decanediol diacrylate is represented by the following Formula VI.

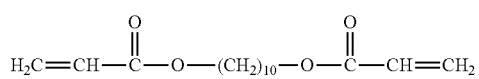

Formula VI

Experimental Example 1: Measurement of the Dispersibilities of GO-Monomers Mixtures Obtained in Examples 1A-1B and Comparative Examples 1C-1F The dispersibilities of GO-monomers mixtures obtained in examples and comparative examples are measured as follows, and the results are shown below. Specifically, the supernatant obtained from the ultracentrifuged GO-monomers mixture is black when GO is well-exfoliated and well-dispersed in the monomers, and therefore the GO-monomers mixture is namely as the graphene dispersion. As the dispersibility of GO decreases, the supernatant obtained from the ultracentrifuged GO-monomers mixture gradually becomes transparent, and more and more not well-exfoliated GO will be precipitated after the centrifugation. Accordingly, the dispersibilities of GO in different monomers can be determined by measuring light-absorption of the supernatants. Since the color of the supernatant of the poor-dispersed GO-monomers mixture is not as deep as that of the well-dispersed GO-monomers mixture, the intensity of the light-absorption of the well-dispersed GO-monomers mixture will be higher than the poor-dispersed GO-monomers mixture.

In this experimental example, the supernatant obtained after the centrifugation is filled in the quartz cuvette, and the pure monomer is filled in another quartz cuvette and both measured by the absorption spectrometer. The results are shown in FIG. 1, wherein the spectra in the wavelength range of 200 nm-800 nm of the pure monomers are already took off from FIG. 1. As shown in FIG. 1, the absorption intensity of example 1A and example 1B are higher than other comparative examples. The result indicates that GO is well-exfoliated and well-dispersed in OPPEA and PHEA. In addition, the result also indicates that the dispersibility of example 1A is much higher than the dispersibility of example 1B. The monomer that contains two benzene rings provides a better dispersibility of GO than the monomer that contains only one benzene ring since it provides a good conjugate structure to graphene such that graphene can be well-exfoliated and well-dispersed.

Example 2A: Preparation of rGO-Monomers Mixture 70 mg of rGO powder and 70 ml of OPPEA are provided and mixed or blended by the planetary mixer for 5 minutes. The ultrasonic treatment is performed to the liquid rGO-OPPEA mixture next. The liquid rGO-OPPEA mixture is next filled into the ultracentrifuge tube and ultracentrifuged at 40000 rpm for 60 minutes so as to obtain the supernatant.

Example 2B: Preparation of rGO-Monomers Mixture

The supernatant is prepared by the same method as Example 2A, except that the ultracentrifugation is performed at 20000 rpm for 10 minutes instead of 40000 rpm for 60 minutes.

Example 2C: Preparation of rGO-Monomers Mixture

The supernatant is prepared by the same method as Example 2A, except using PHEA instead of OPPEA.

Example 2D: Preparation of rGO-Monomers Mixture

The supernatant is prepared by the same method as Example 2B, except using PHEA instead of OPPEA.

Comparative Example 2E: Preparation of rGO-Monomers Mixture

The supernatant is prepared by the same method as Comparative Example 1C, except using rGO instead of GO.

Comparative Example 2F: Preparation of rGO-Monomers Mixture

The supernatant is prepared by the same method as Comparative Example 1D, except using rGO instead of GO.

Comparative Example 2G: Preparation of rGO-Monomers Mixture

The supernatant is prepared by the same method as Comparative Example 1E, except using rGO instead of GO.

Comparative Example 2H: Preparation of rGO-Monomers Mixture

The supernatant is prepared by the same method as Example 1A, except using 1, 9-nonanediol diacrylate instead of OPPEA and using rGO instead of GO. 1, 9-nonanediol diacrylate is represented by the following Formula VII.

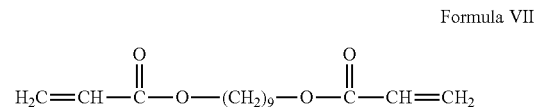

Formula VII

Comparative Example 2I: Preparation of rGO-Monomers Mixture

The supernatant is prepared by the same method as Comparative Example 1F, except using rGO instead of GO.

Figure 2:
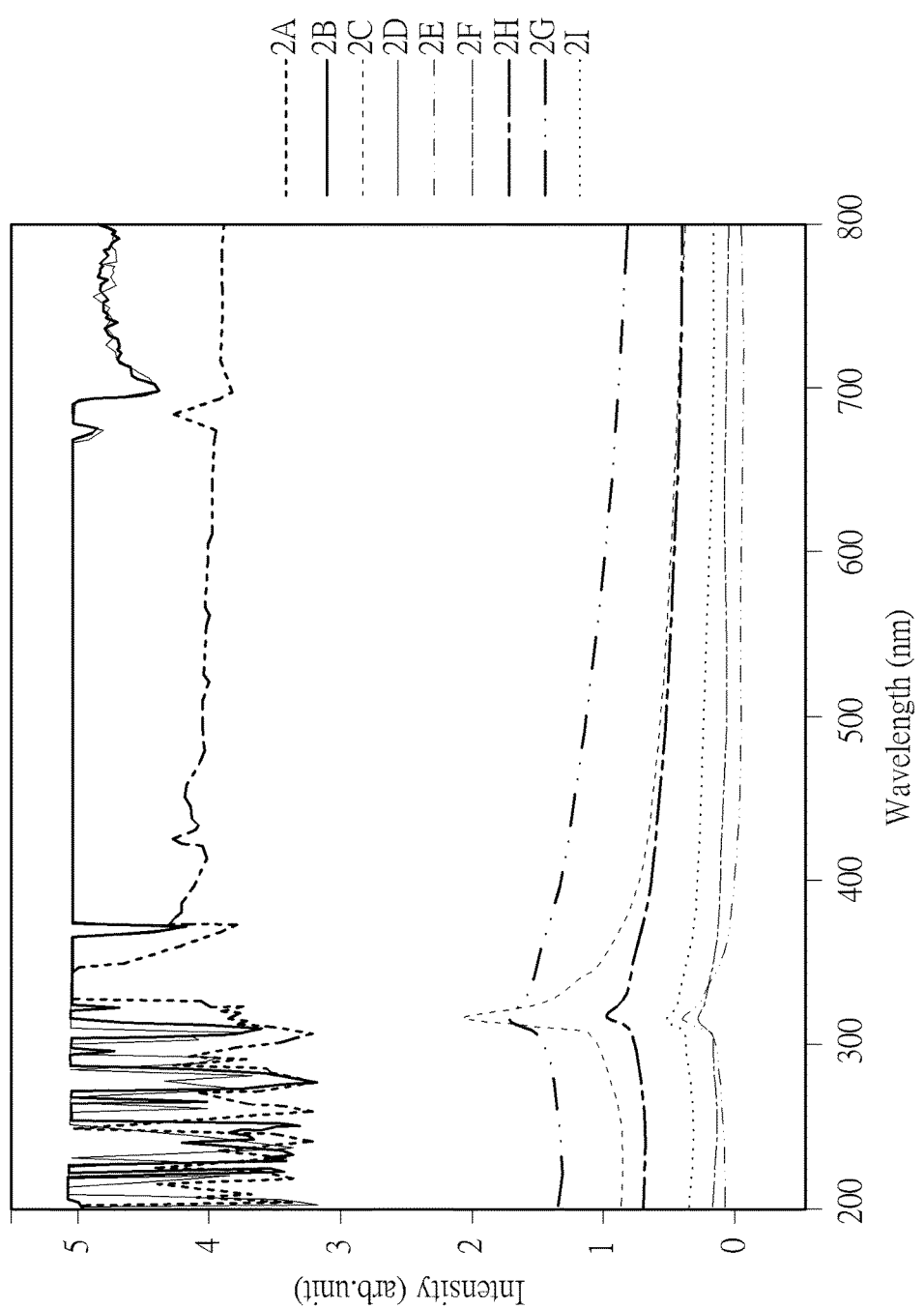
FIG. 2 is a schematic diagram illustrating absorption spectra of supernatants according to Experimental Example 2 of the present invention.

Experimental Example 2: Measurement of the Dispersibilities of rGO-Monomers Mixtures Obtained in Examples 2A-2D and Comparative Examples 2E-2I In this experimental example, the preparation and method of measuring the light-absorption of the supernatant is the same as the experimental example 1. The results are shown in FIG. 2, wherein the spectra in the wavelength range of 200 nm-800 nm of the monomers are already took off from FIG. 2. As shown in FIG. 2, the absorption intensity of examples 2A, 2B and 2D are higher than example 2C, and the absorption intensity of examples 2A, 2B, 2C and 2D are much higher than all of the comparative examples. The result indicates that rGO can be well-exfoliated and well-dispersed in OPPEA and PHEA.

Example 3A: Preparation of High Purity Graphene-Monomers Mixture 70 mg of high purity graphene powder and 70 ml of OPPEA are provided and mixed or blended by the planetary mixer for 5 minutes. The ultrasonic treatment is performed to the liquid high purity graphene-OPPEA mixture next. The liquid high purity graphene-OPPEA mixture is next filled into the ultracentrifuge tube and ultracentrifuged at 40000 rpm for 60 minutes so as to obtain the supernatant.

Example 3B: Preparation of High Purity Graphene-Monomers Mixture

The supernatant is prepared by the same method as Example 3A, except using PHEA instead of OPPEA.

Example 3C: Preparation of High Purity Graphene-Monomers Mixture

The supernatant is prepared by the same method as Example 1B, except using high purity graphene instead of GO.

Comparative Example 3D: Preparation of High Purity Graphene-Monomers Mixture The supernatant is prepared by the same method as Comparative Example 1C, except using high purity graphene instead of GO.

Comparative Example 3E: Preparation of High Purity Graphene-Monomers Mixture The supernatant is prepared by the same method as Comparative Example 1D, except using high purity graphene instead of GO.

Comparative Example 3F: Preparation of High Purity Graphene-Monomers Mixture The supernatant is prepared by the same method as Comparative Example 1E, except using high purity graphene instead of GO.

Comparative Example 3G: Preparation of High Purity Graphene-Monomers Mixture The supernatant is prepared by the same method as Example 2H, except using high purity graphene instead of rGO.

Comparative Example 3H: Preparation of High Purity Graphene-Monomers Mixture The supernatant is prepared by the same method as Comparative Example 1F, except using high purity graphene instead of GO.

Figure 3:
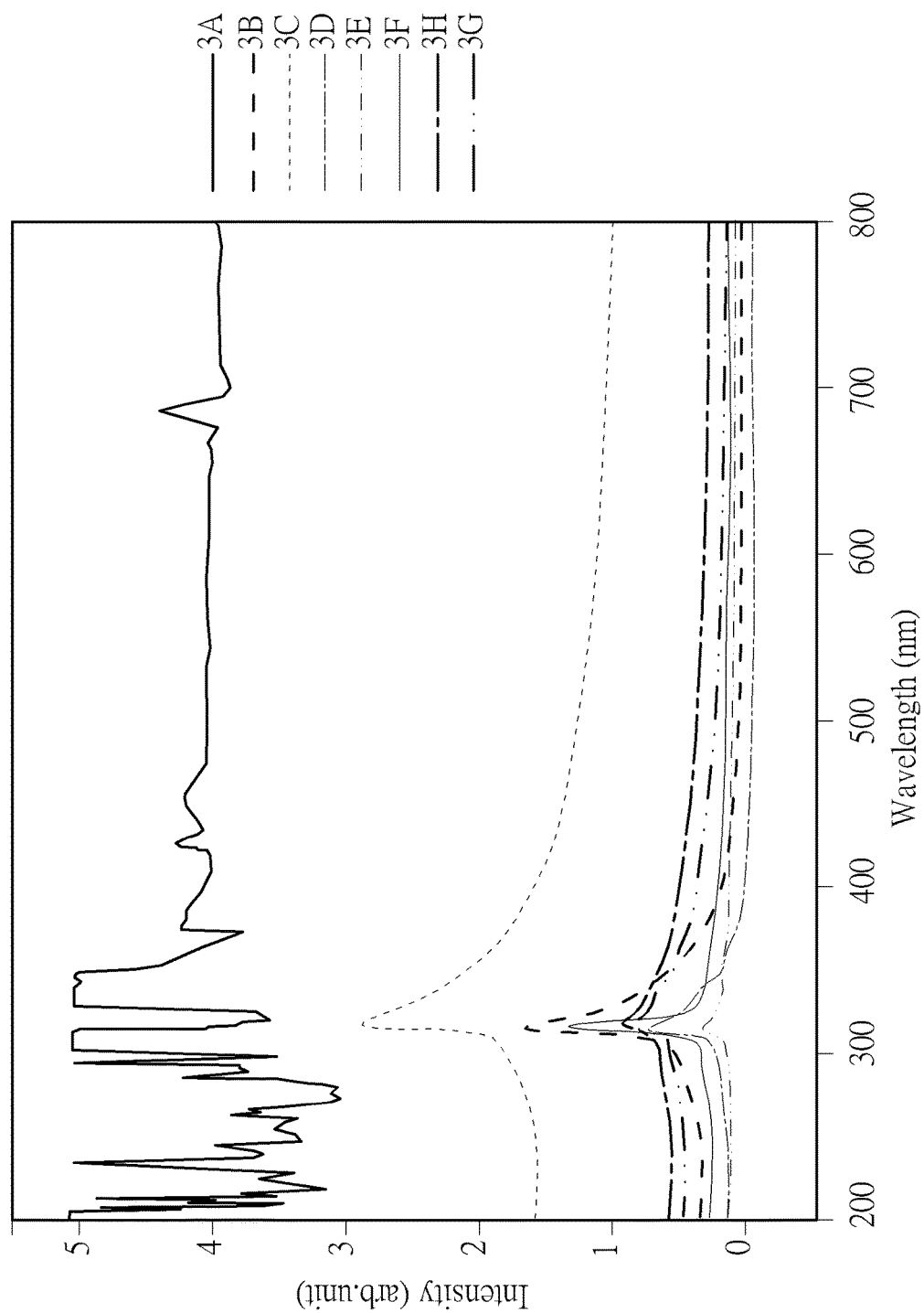
FIG. 3 is a schematic diagram illustrating absorption spectra of supernatants according to Experimental Example 3 of the present invention.

Experimental Example 3: Measurement of the Dispersibilities of High Purity Graphene-Monomers Mixtures Obtained in Examples 3A-3C and Comparative Examples 3D-3H In this experimental example, the preparation and method of measuring the light-absorption of the supernatant is the same as the experimental example 1. The results are shown in FIG. 3, wherein the spectra in the wavelength range of 200 nm-800 nm of the monomers are already took off from FIG. 3. As shown in FIG. 3, the absorption intensity to light with 300 nm-350 nm of example 3B is higher than comparative examples 3D-3G, the absorption intensity of example 3C is much higher than example 3B and other comparative examples, and the absorption intensity of example 3A is even much higher than example 3C. The result indicates that high purity graphene can be well-exfoliated and well-dispersed in OPPEA and PHEA. In addition, since the absorption intensity of example 3A is higher than example 3B and example 3C, the dispersibility of high purity graphene in OPPEA is higher than the dispersibility of high purity graphene in PHEA. The monomer that contains two benzene rings provides a better dispersibility of high purity graphene than the monomer that contains only one benzene ring.

In conclusion, according to the results of experimental examples 1-3, it is convinced that GO, rGO and high purity graphene may all be well-exfoliated by the specific polymerizable monomers of the present invention. In addition, GO, rGO and high purity graphene may further be well-dispersed with the polymerizable monomers and form the graphene dispersions. Therefore, the preparation of the graphene dispersion does not required additional dispersant in the present invention. Accordingly, a graphene reinforced polymer with uniformed-dispersed graphene is further provided, which is polymerized from the graphene dispersion of the present invention. In order to form the graphene reinforced polymer of the present invention, one or more initiators may be added into the graphene dispersion of the present invention. As a result, the well-dispersed graphene in the graphene reinforced polymer of the present invention is capable of being applied to enhance the performance of the polymers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A graphene dispersion comprising:
   a graphene material; and
   a polymerizable monomer including a structure comprising:
   a first part including at least one benzene ring at one end of the structure; and
   a second part having polarity at another end of the structure.

2. The graphene dispersion according to claim 1, wherein the first part including at least one benzene ring is selected from the group consisting of a phenyl group and a phenoxy group.

3. The graphene dispersion according to claim 1, wherein the first part comprises a biphenyl group.

4. The graphene dispersion according to claim 1, wherein the first part is conjugated to the graphene material through 7C-7C interactions.

5. The graphene dispersion according to claim 1, wherein the second part having polarity is selected from the group consisting of an acrylate-based functional group, a methacrylate-based functional group, a thiol-based functional group, an epoxide-based functional group, and an isocyanate-based functional group.

6. The graphene dispersion according to claim 1, wherein the second part having polarity comprises maleic anhydride group.

7. The graphene dispersion according to claim 1, wherein the polymerizable monomer is selected from a group consisting of 2-phenoxy ethyl acrylate (PHEA) and ortho-phenyl phenoxy ethyl acrylate (OPPEA).

8. The graphene dispersion according to claim 1, wherein the graphene material comprises a plurality of graphene nanosheets, a plurality of graphene petals or a plurality of graphene nanoplatelets.

9. The graphene dispersion according to claim 1, wherein a content of the graphene material is 0.1% to 0.5% by weight.

10. The graphene dispersion according to claim 1, further comprising an initiator.

11. The graphene dispersion according to claim 10, wherein the initiator comprises one of 1-hydroxy-cyclohexyl-phenyl-ketone, benzophenone, 2-hydroxy-2-methyl- 1-phenyl-1-propanone, 2-hydroxy-1-[4-(2-hydroxyethoxy) phenyl]-2-methyl-1-propanone, alpha, alpha-dimethoxy-alpha-phenylacetophenone, oxy-phenyl-acetic acid 2-[2 oxo-2 phenyl-acetoxy-ethoxy]-ethyl ester, oxy-phenyl-acetic 2-[2-hydroxy-ethoxy]-ethyl ester, methylbenzoylformate, 2-benzyl-2-(dimethylamino)-1-[4-(4-morpholinyl) phenyl]-1-butanone, 2-Methyl-1-[4-(methylthio)phenyl]-2-(4-morpholinyl)-1-propanone, diphenyl (2,4,6-trimethylbenzoyl)-phosphine oxide, phosphine oxide, phenyl bis(2, 4,6-trimethylbenzoyl)-phosphine oxide, bis(eta 5-2,4-cyclopentadien-1-yl)-bis[2,6-difluoro-3-(1H-pyrrol-1-yl) phenyl]titanium, and iodonium, (4-methylphenyl) [4-(2-methylpropyl) phenyl]-, hexafluorophosphate(1-).

12. The graphene dispersion according to claim 10, wherein a content of the initiator is 2% to 20% by weight.

13. The graphene dispersion according to claim 1, wherein the graphene material and the polymerizable monomer are mixed by an ultrasonic treatment and using a planetary mixer.

14. The graphene dispersion according to claim 1, wherein the graphene material comprises graphene oxide (GO), and a number of oxygen (O) atoms is present in an amount of 50 or more than 50 atomic percent of the graphene oxide.

15. The graphene dispersion according to claim 1, wherein the graphene material comprises reduced graphene oxide (rGO), and a number of oxygen (O) atoms is present in an amount of 3 to 50 atomic percent of the reduced graphene oxide.

16. The graphene dispersion according to claim 1, wherein the graphene material comprises high purity graphene, and a number of oxygen (O) atoms is present in an amount less than 3 atomic percent of the high purity graphene.

17. The graphene dispersion according to claim 1, wherein the graphene dispersion does not comprise any dispersant.

18. A graphene reinforced polymer, wherein the graphene reinforced polymer is polymerized from the graphene dispersion according to claim 1.

19. The graphene reinforced polymer according to claim 18, wherein the graphene material included in the graphene reinforced polymer has a solid content from $1*10^{-3}$% to 90% by weight.

20. The graphene reinforced polymer according to claim 18, wherein the graphene reinforced polymer is polymerized with a UV light treatment or a heat treatment.

* * * * *